United States Patent
Duffey et al.

(10) Patent No.: US 7,851,933 B2
(45) Date of Patent: Dec. 14, 2010

(54) SYSTEM FOR GENERATING CONSTANT SPEED OUTPUT FROM VARIABLE SPEED INPUT

(76) Inventors: Christopher K. Duffey, 14700 SE. Megan Way, Clackamas, OR (US) 97015; Leslie R. Smith, 17039 S. Bradley Rd., Oregon City, OR (US) 97045

( * ) Notice: Subject to any disclaimer, the term of this patent is extended or adjusted under 35 U.S.C. 154(b) by 943 days.

(21) Appl. No.: 11/686,874

(22) Filed: Mar. 15, 2007

(65) Prior Publication Data
US 2008/0223684 A1 Sep. 18, 2008

(51) Int. Cl.
F03D 3/04 (2006.01)

(52) U.S. Cl. ............ 290/44; 290/43; 290/40 C; 290/40 A; 310/68

(58) Field of Classification Search ............ 290/44, 290/43, 40 C, 40 A; 310/68
See application file for complete search history.

(56) References Cited

U.S. PATENT DOCUMENTS

| | | | |
|---|---|---|---|
| 4,565,929 A | 1/1986 | Baskin et al. | |
| 6,969,922 B2 | 11/2005 | Welches et al. | |
| 7,294,947 B2 | 11/2007 | Corbin et al. | |
| 7,348,684 B2 * | 3/2008 | Franke | 290/40 C |
| 7,362,001 B2 * | 4/2008 | Kusumi | 290/31 |
| 7,402,916 B2 * | 7/2008 | Taspinar et al. | 290/22 |
| 2004/0026929 A1 | 2/2004 | Rebsdorf et al. | |
| 2004/0217594 A1 | 11/2004 | Feddersen et al. | |
| 2004/0217595 A1 | 11/2004 | Feddersen et al. | |
| 2004/0217596 A1 | 11/2004 | Feddersen et al. | |
| 2004/0222642 A1 | 11/2004 | Siebenthaler et al. | |
| 2006/0261765 A1 | 11/2006 | Prasanna | |
| 2007/0007835 A1 | 1/2007 | Wise | |
| 2007/0290563 A1 | 12/2007 | Zhao et al. | |
| 2008/0026902 A1 | 1/2008 | Willie | |

(Continued)

FOREIGN PATENT DOCUMENTS

JP 09-065623 A 3/1997

(Continued)

OTHER PUBLICATIONS

Patent Cooperation Treaty, International Search Report for PCT/US09/047866, mailed Feb. 9, 2010.

(Continued)

*Primary Examiner*—T C Patel
*Assistant Examiner*—Iraj A Mohandesi
(74) *Attorney, Agent, or Firm*—Holme Roberts & Owen LLP

(57) ABSTRACT

An input shaft rotates at variable rotation rates and is driven by a variable source of energy or power such as by the propeller of a wind-driven electrical generator. The input shaft is connected to a clutch which is connected to an output shaft and which is operable to rotate the output shaft at a preselected or constant rotation rate. The clutch has a first rotor which electromagnetically interacts with a second rotor to create a torque to cause the second rotor to rotate. The interaction of the first rotor and the second rotor may be varied electrically or mechanically to vary the torque and in turn the rotation rate of the second shaft. The shaft is preferably connected to a synchronous generator; and the rotation rate of the output shaft is controlled so that the generator supplies power at an essentially constant rotation rate.

38 Claims, 10 Drawing Sheets

U.S. PATENT DOCUMENTS

2008/0150282 A1    6/2008    Rebsdorf et al.
2009/0224607 A1    9/2009    Kjaer et al.

FOREIGN PATENT DOCUMENTS

JP    2007-185003 A    7/2007
WO    00-31857 A1    6/2000

OTHER PUBLICATIONS

Patent Cooperation Treaty, Written Opinion of the International Searching Authority for PCT/US09/047866, mailed feb. 9, 2010.

Sigrid M. Bolik, Modelling and Analysis of Variable Speed Wind Turbines with Induction Generator during Grid Fault, book, Institute of Energy Technology Aalborg University, Denmark, Oct. 2004, General background, Chapters 7,8 and 9; pp. 97-156.

International Search Report, mailed Jul. 25, 2008.

Written Opinion of the International Searching Authority, mailed Jul. 25, 2008.

* cited by examiner

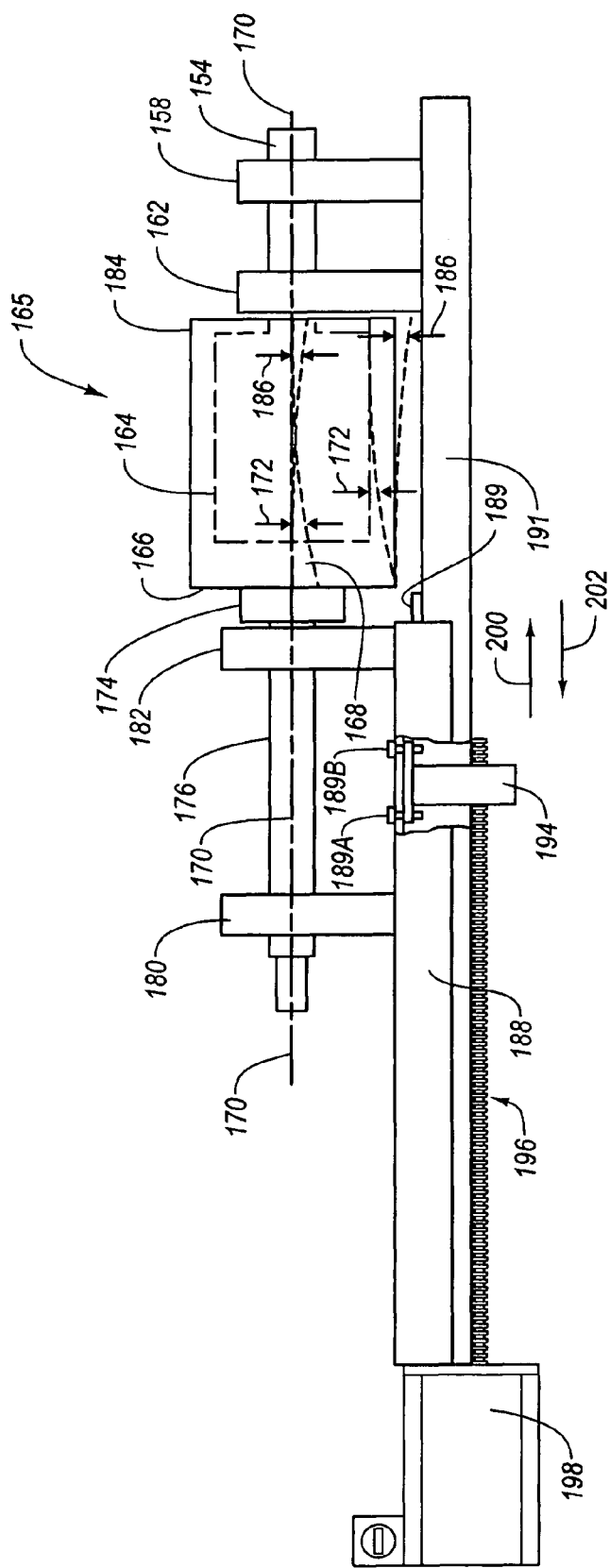
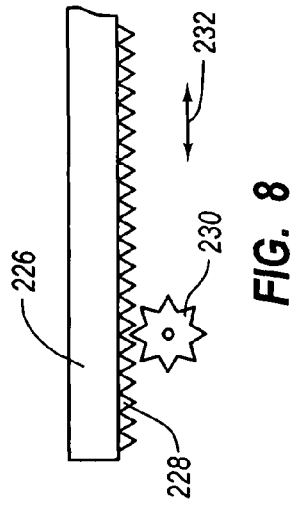
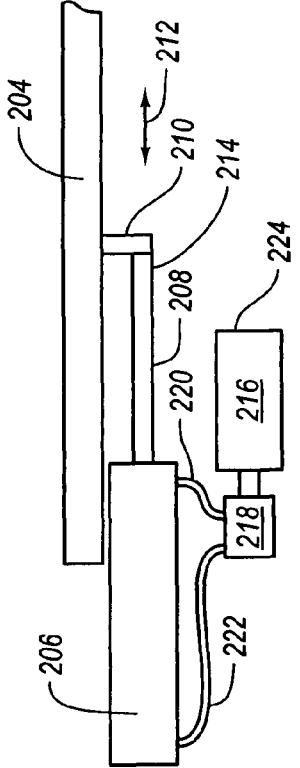
FIG. 6
FIG. 7
FIG. 8

SYSTEM FOR GENERATING CONSTANT SPEED OUTPUT FROM VARIABLE SPEED INPUT

BACKGROUND OF THE INVENTION

1. Field

This application relates to systems that transfer or convert power or energy delivered by a prime mover into useful energy and more particularly to systems which receive power or energy in from a source that delivers power through a shaft that rotates at variable rates and generates an output at a desired rotation rate such as one that is essentially or substantially constant and even more particularly to systems that convert energy from a prime mover like a propeller driven by wind, a water turbine, or a wave turbine, into AC power.

2. The Relevant Technology

Wind turbines (e.g., GE Energy 1.5 mw series wind turbine found at http://www/gepower.com), water turbines (e.g., http://en.wikipedia.org) and wave turbines (e.g., Islay Wave Power Station reported by the BBC at http://news.bbc.co.uk/1/hi/sci/tech/103148.stm) have been developed for, among other things, generating electrical power. However, because the wind speed is variable, because wave characteristics such as height and frequency vary with many factors including wind speed and direction, and because the water flow rates from dams vary with season and weather, the electrical power produced by generators powered by such (hereinafter called "environmentally powered generators") is typically produced at electrical frequencies which vary widely and somewhat randomly with related natural phenomenon. Because power distribution (into the power distribution grid) and power obtained by users receiving power from such a generator or the grid needs to be at or very close to a selected and stable frequency, like 60 Hertz (Hz) in the United States, the power from the environmentally powered generators must be converted to the desired or selected stable frequency by suitable frequency conversion devices (e.g., the 1.5 mw series GE wind turbines are reported to be connected to a pulse width modulated IGBT frequency converter). Devices for converting input power at variable frequency to output power at a stable frequency are believed to be inefficient. As a result, it is believed that much useful power or electrical energy generated by environmentally powered generators is lost or wasted. Inasmuch as the amount of electrical power supplied to the various power grids across the United States by environmentally powered turbines is increasing, it can be seen that much power is being wasted in connection with conversion to power grid frequencies.

Systems to extract more of the useful energy from the environmentally powered generators are not known. That is, systems to power the environmentally powered electrical generators at a constant rotation rate from the prime mover that has a variable rotation rate are not known. Indeed, systems for efficiently supplying rotational energy or torque at a constant shaft rotation rate using energy or torque delivered by a shaft powered by any prime mover that supplies power at a rotation rate that varies are not known.

SUMMARY OF THE INVENTION

A system for supplying output torque or energy at a substantially constant shaft rotation rate receives power from a machine such as a prime mover that supplies energy or power through a shaft that rotates at variable rotation rates. The system includes a clutch for interconnecting the shaft of the prime mover or a driving shaft at a first shaft rotation rate or variable rotation rate to the shaft of a driven machine or second machine having a second shaft for rotation at a substantially constant rotational rate or second shaft rotation rate.

The clutch includes a first rotor connected to the first shaft and a second rotor connected to a second shaft. The first rotor and the second rotor rotate relative to each other. The first rotor is configured to be one of a first element and a second element of an electrical machine that rotates; and the second rotor is configured to be the other of the first element and second element of an electrical machine. That is, an electrical machine, like a motor or a generator, typically has a rotating element and a stationary element. These are sometimes called a stator and a rotor. The two elements are mechanically and electrically configured to electromagnetically interact to generate electrical energy (a generator) or to generate torque through a rotating output shaft (a motor). The system at hand has two elements that are comparable to the two elements, but different because both elements rotate. That is, as one element rotates, the other rotates with it in the same direction but at a different rotation rate.

In a motor, electrical power is supplied to the machine typically to rotate an output shaft to obtain useful work. Alternately, electrical output power can be obtained by rotating an input shaft in a similarly configured machine. In either case, well-known principles of electromagnetism are involved and produce a torque between the two elements of such machines.

In one form of the present invention, the torque developed between the first rotor and the second rotor urges the second rotor to rotate relative to the first rotor and in turn it causes the second shaft to rotate at the second shaft rotation rate. To produce the torque, a current is supplied to one of the first element or the second element of an electrical machine from a source of electrical power to create a magnetic field which interacts with the other of the first element and the second element.

The clutch operates to regulate the rotation rate of the driven second shaft by varying the torque generated between the two elements. The regulation may be effected electrically by regulating the current supplied to one of the first element or the second element. Alternately, the regulation may be effected by moving the first element relative to the second element to in turn vary the torque developed and in turn the rotation rate of the driven shaft.

That is, the clutch preferably has torque varying means connected to any one of the first rotor, the second rotor, or the source of electrical power to vary the torque developed between the first rotor and the second rotor. Sensing means are positioned and configured to sense the second shaft rotation rate and to supply a second shaft rate signal reflective of the second shaft rotation rate.

Control means are optimally connected to the sensing means to receive the second shaft rate signal. The control means is also connected to the torque varying means to supply a torque varying signal thereto. The control means is configured to compare the second shaft rotation rate with a preselected, constant, or desired rotation rate and generate a control signal or torque varying signal to cause the torque varying means to vary the torque to urge the second shaft to rotate at the preselected or desired rotation rate. The desired rotation rate can be such that the rotation rate of the second shaft is essentially constant and is selected so that a driven machine may be a synchronous generator that supplies power at a constant frequency such as 60 HZ.

In one embodiment, the first rotor has a first length; and the second rotor has a second length. The torque varying means includes positioning means operable to vary the position of the first rotor and the second rotor relative to each other along their respective first length and second length to vary the torque.

In another configuration of the clutch, the first shaft has a first shaft axis and the second shaft has a second shaft axis. The shafts are oriented with respect to each other so that the first shaft axis and the second shaft axis are the same axis. In this configuration, the first rotor and the second rotor may move relative to each other to vary the torque.

In a preferred arrangement the first rotor and the second rotor are formed for one to be positioned within the other and to be rotatable relative to each other to generate a torque to cause the second rotor and the second shaft to rotate. Positioning means is connected to one of the first rotor and the second rotor for moving the first rotor and the second rotor relative to each other along their respective lengths. The control means is to generate a positioning signal to cause the positioning means to position the rotors relative to each other to vary the interaction and the torque to operate the second shaft at a substantially constant rotational rate or at a rate that is selected by the user through the control means.

In one arrangement, the first rotor is circular in cross section and sized to fit within a cylindrical space. The second rotor is formed to be circular in cross section with an internal surface defining a cylindrical space with an opening at one end. The cylindrical space is sized to receive the first rotor therewithin. The first rotor has an external surface, and the second rotor has an internal surface. An electrical current is supplied to one of the two rotors so that upon rotation a torque is generated to urge the second rotor to rotate.

In an alternate configuration, the positioning means includes a motor and a drive mechanism connected to be driven by the motor. The drive mechanism is attached to one of the second rotor, the second shaft and related supporting structure or second shaft support means. The drive mechanism is operable to cause second shaft support means and, in turn, the second rotor, to move relative to the first rotor to vary the torque generated and to regulate the rotational speed of the second rotor. In one arrangement the positioning means is a hydraulic piston having a piston rod attached to said second shaft support means. In another arrangement, the mechanism is a screw rotatable by said motor and attached to said second shaft support means.

In yet another arrangement, the drive mechanism is a rack connected to move the second shaft or second rotor and a pinion in contact with the rack. The motor is connected to rotate the pinion and in turn move the rack. In one assembly that is desired, the shaft rate detector is associated with the second shaft. Alternately, it may be associated with the rotor. It may also be a frequency detector to monitor the frequency of output electrical power.

In one highly preferred system, the prime mover is a propeller. In one arrangement the propeller is configured to be propelled by wind and more preferably is connected as part of a wind turbine of the type that is powered by a propeller. Alternately, the propeller may be a water propeller that is part of a water turbine. In yet another alternate system, the prime mover is powered by waves that compress air in a chamber and supply it to a propeller. In such systems, the prime mover rotates a shaft to supply power to a clutch that is connected to a second shaft. A synchronous generator is connected to the second shaft. The synchronous generator is configured to generate electrical power at a preselected and preferably constant frequency.

BRIEF DESCRIPTION OF THE DRAWINGS

In the drawings, which illustrate what is presently regarded as the preferred embodiments:

FIG. 6 is a simplified side view of the clutch of FIG. 5;

FIG. 7 is a simplified side view of portions of a clutch with a hydraulic device to cause relative movement between the first rotor and the second rotor;

FIG. 8 is a simplified side view of portions of a clutch with a rack and pinion system to cause relative movement between the first rotor and the second rotor;

DETAILED DESCRIPTION OF THE EMBODIMENTS

Figure 1:
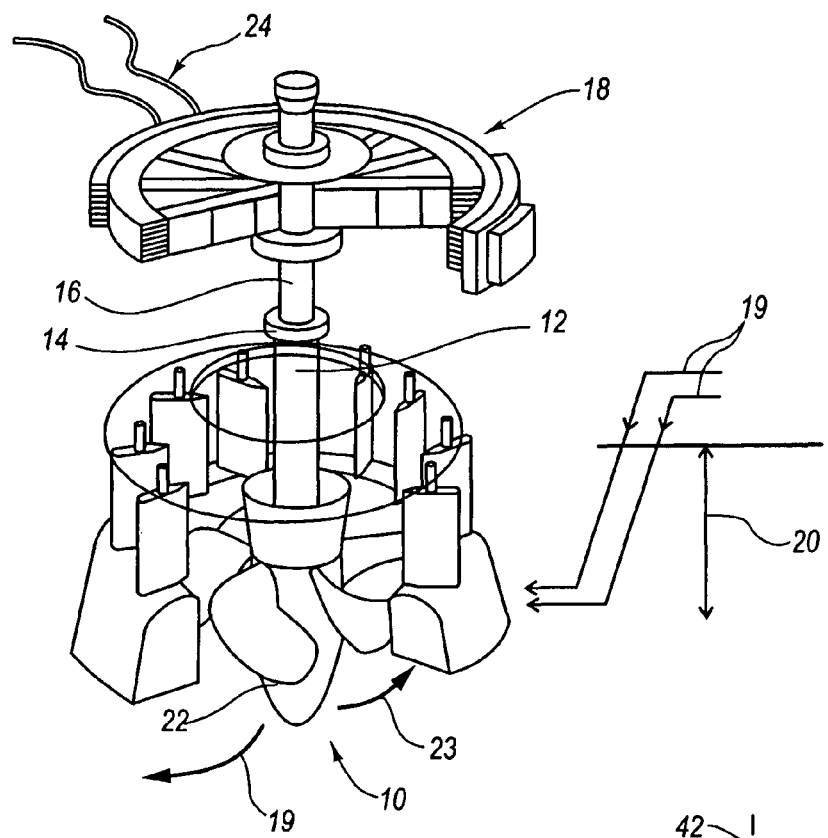
FIG. 1 is a partial perspective of a water turbine-generator combination of the present invention.

In FIG. 1, a prime mover or source of rotational torque such as water turbine 10 is connected by a lower vertical shaft 12 that rotates at different rotation rates through a clutch 14 and an upper vertical shaft 16 that rotates at a substantially constant rotation rate to a generator 18 configured to produce electricity. In operation, water 19 stored or provided at a height 20 (e.g., behind a water dam) is directed through channels or chutes to fall or flow from the height 20 to attain velocity and inertia. It is then directed through directional gates 21 and over turbine blades 22 configured to rotate 23 upon the application of force supplied by the moving water 19. Thus, the potential energy of the water stored at height 20 is converted into kinetic energy as it falls which is then converted into mechanical energy in the form of rotational torque. The rotation of the turbine blades 22 of the turbine 10 causes the lower vertical shaft 12 to rotate which in turn rotates a portion of the clutch 14 as discussed more fully hereinafter. The clutch 14 functions to transfer the rotational torque from shaft 12 to upper vertical shaft 16 in such a way that upper vertical shaft 16 rotates at an essentially constant rotation rate (RPM). In turn the generator 18 rotates at an essentially constant rotational rate. In turn the generator 18 may be of the type that can be configured and wired to produce electrical power at the output 24 which is a stable and at an essentially constant frequency.

Figure 2:
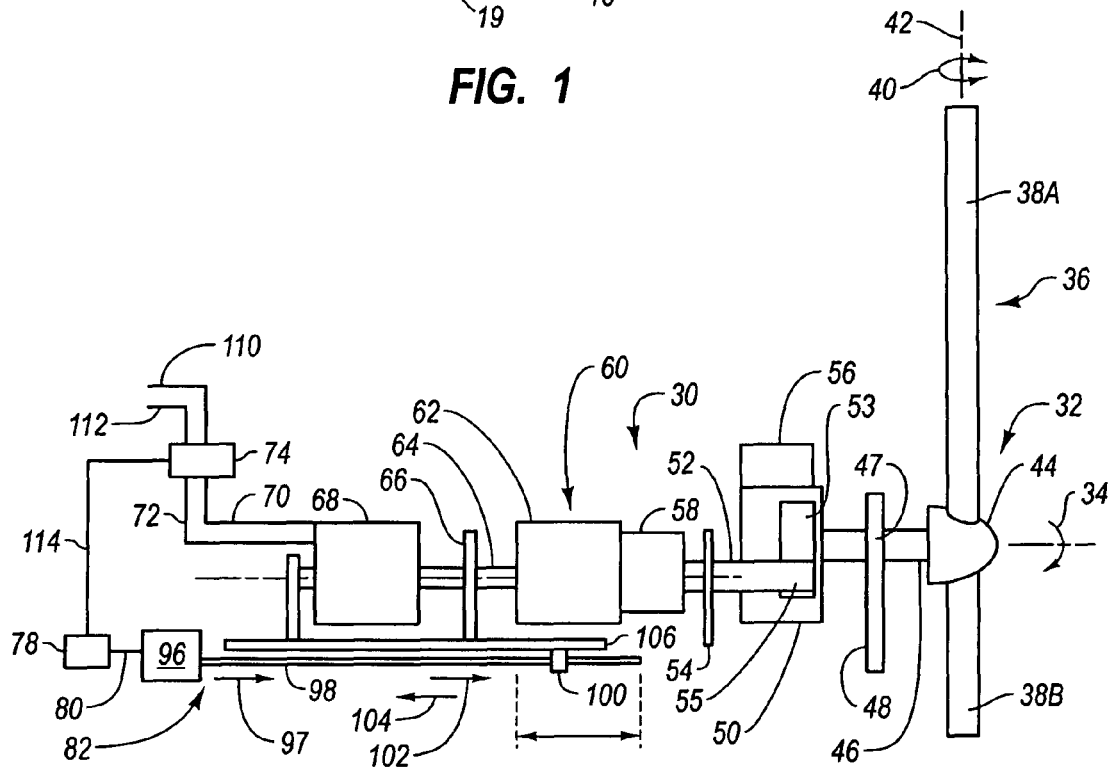
FIG. 2 is a simplified side view of a wind turbine system of the present invention.

In FIG. 2, the prime mover is a wind turbine system 30. It has a propeller 32 shaped and sized to rotate 34 upon movement of air 36 past the blades 38A and 38B. The blades 38A and 38B are configured to rotate 40 about their radial axis 42 so that the pitch angle of the blades (angle of the blade) in relation to the relative wind or air flow 36 can be varied. That is, the pitch of the blades 38A and 38B can vary to limit or regulate the rotation rate 34 of the propeller 32 to enhance rotation at lower air or wind speeds and to avoid over-speed in higher wind conditions. Indeed, in some systems, a brake may be provided to limit or slow rotation of propeller 32 above a set rate to, among other things, avoid over speeding the propeller 32 and other components in the system. The pitch of the blades 38 A and 38 B may be varied by a mechanism in the hub or spinner 44 which operates to rotate 40 the blades 38A and 38 B about their axis 42.

The propeller 32 is connected to a propeller shaft 46 that is supported by one or more bearings positioned in suitable supports or housings such as bearing 47 positioned in a shaft support 48. The propeller shaft 46 is connected to a gear box 50 that contains driving and driven gears (not shown) to transfer the torque or energy from shaft 46 to a second driving shaft 52 that is also supported by one or more bearings contained in a suitable shaft or bearing support like support 54. Typically, the shaft 46 is rotating at a relatively low shaft rate (revolutions per minute or RPM) and is driving a relatively large gear or bull gear 53 connected to drive a smaller gear or pinion gear 55 attached to the second driving shaft 52. The bull gear 53 and the pinion gear 55 are preferably provided with interconnecting helical teeth to cause a highly efficient transfer of mechanical energy. To avoid excessive heat and to lubricate the gears, the bull gear 53 and pinion gear 55 are maintained in an oil bath. An oil pump (not shown) is connected to be driven by one of the shafts 46 or 52 to pump the oil in the gear box 50 through an oil cooler 56 that operates to keep the oil and in turn the gears in the gear box 50 within a desired temperature range. In some embodiments, multiple bull gear-pinion gear arrangements may be used. In yet other embodiments, planetary gears may be used to cause the transfer of torque from the source of power (e.g., propeller). The particular gear configuration selected between the source of rotational torque (e.g., a propeller of a wind turbine) and the shaft delivering rotational torque to a clutch is selected based on, for example, the size of the structures and the materials used.

The second driving shaft 52 is connected to a clutch mechanism of the type that can transfer energy from a prime mover that delivers power or torque though a shaft that rotates at rates that vary to a shaft that rotates at a rate that is relatively or substantially constant. More particularly the second driving shaft 52 receives power from a prime mover like a propeller 32 (FIG. 2) and/or a water turbine (FIG. 1) through an optional transmission like gear box 50 used to regulate the rotation rate of a shaft like second shaft 52. The second driving shaft 52 is connected to one of a first element or a second element of an electrical machine. A driven shaft 64 is connected to the other of the first element and second element of the electrical machine. More specifically, the second driving shaft 52 is connected to a first rotor 58 and the output shaft 64 is connected to a second rotor 62 which together operate as an electromagnetic clutch such as clutch 60.

The electromagnetic clutch 60 is configured to vary the torque generated by the electromagnetic interaction between the first element and the second element of an electrical machine and as here shown between the first rotor 58 and the second rotor 62 with a magnetic field being generated by the windings of the appropriately configured element as hereinafter discussed. That is, the strength of the field can be varied by changing the electrical current delivered from an external source to vary the torque developed. By varying the torque, the rotation rate of the first element relative to the second element and more specifically rotation rate of the first rotor 58 is faster than the rotation rate of the second rotor 62 so that there is relative motion or slip between the first rotor 58 and the second rotor 62. By varying the torque, the rotation rate of the second rotor 62 can be varied to maintain the rotation rate of the driven or third shaft like shaft 64 at an essentially constant rotation rate.

In FIG. 2, the clutch 60 includes a first element or first rotor 58 positioned within the second element or second rotor 62. The term "element" is used herein because the first rotor 58 and the second rotor 62 are comparable to the basic elements of an electrical machine, namely the stator and rotor of a traditional induction electrical machine. However, the first rotor 58 and the second rotor 62 differ from the traditional electrical machine because both rotors or elements rotate.

Figure 3:
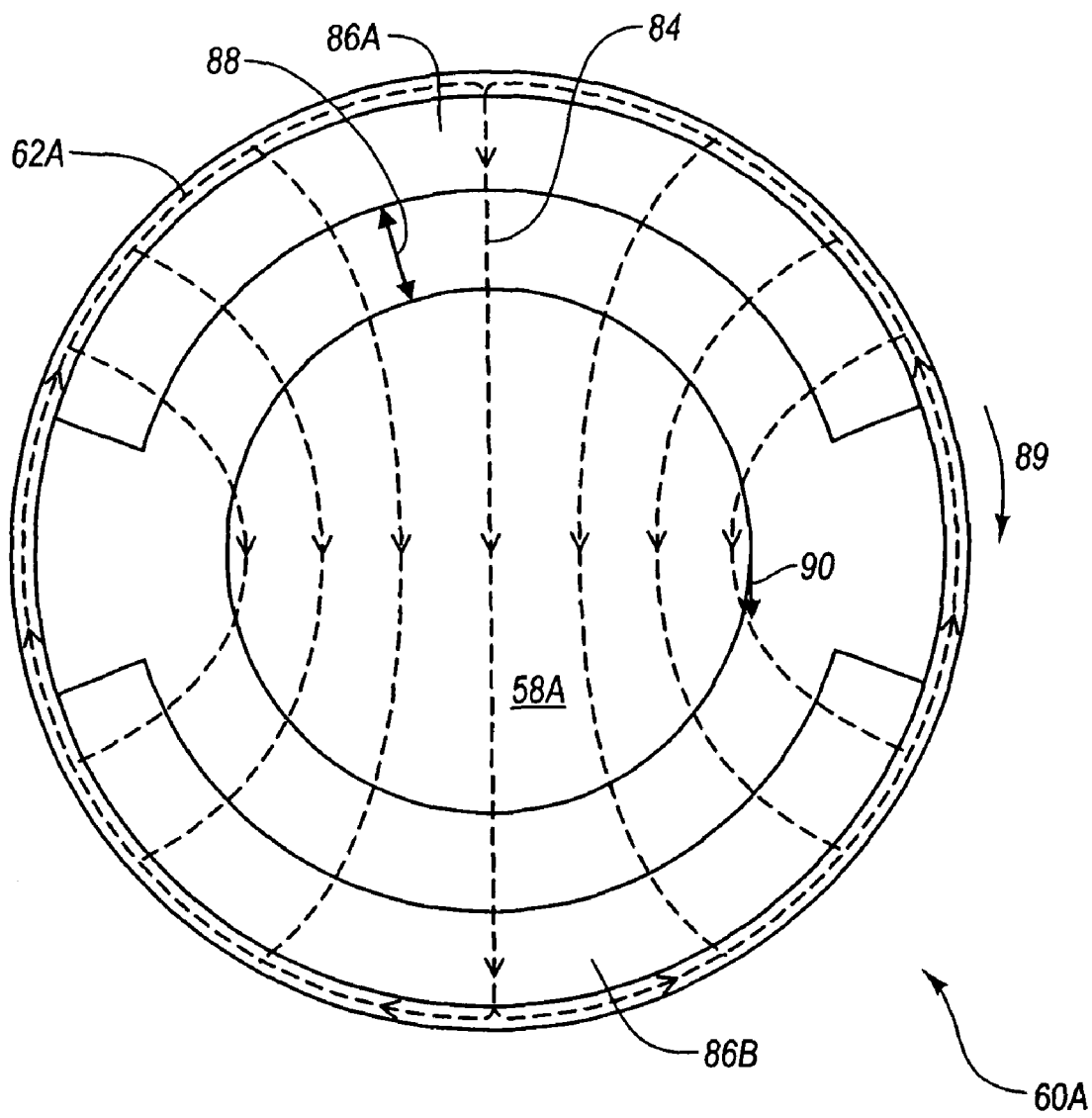
FIG. 3 is a simplified depiction of parts of the magnetic fields of the first rotor and second rotor interacting.

FIG. 3 is a very simplified end view of the first rotor 58A of clutch 60A. The first rotor 58A is constructed in a manner or comparable to a squirrel cage rotor of a typical induction motor. The second rotor 62A surrounds the first rotor 58A; and the second rotor 62A is configured to effect a magnetic interaction between the first rotor 58A and the second rotor 62A so that one makes or causes the other to rotate in the same direction as the other and at the same rotation rate in a no load condition. Of course with a load the rotated rotor will rotate at a rate that is less than the rotation rate of the driving rotor. The difference in rotation rates is what is called slip.

As seen in FIG. 3, the magnetic field 84 is illustrated using dotted lines. The magnetic field is formed by electromagnets 86A and 86B positioned opposite each other on the interior surface of the second rotor 62A. In different applications, a plurality of electromagnets may be positioned on the interior surface of the second rotor 62A spaced apart suitably to form suitable pairs. The magnetic field 84 is illustrated in two dimensions and with dotted lines when it should be understood that a magnetic field is three dimensional and invisible.

In FIG. 3, the magnetic field 84 bridges the gap 88 between the first rotor 58A and the second rotor 62A. The gap 88 is here shown to be quite large, when in practical machines the gap may be quite small (e.g, 1-4 mm). As the magnetic field 84 engages the first rotor 58A, it creates a current in the rotor 58A and generates a torque illustrated by the arrow 90. In turn, the first rotor 58A is rotated in the same direction 89 as the second rotor 62A. The torque varies with the strength of the magnetic field 84 and amount of the first rotor 58A exposed to the magnetic field 84. In turn the torque from the interaction of the magnetic field created by the several magnets positioned about the interior surface of the second rotor 62A creates a total torque to urge the driven rotor to rotate and to in turn drive the output shaft and, in preferred applications, a synchronous generator.

Notably, the clutch 60A is of the type that the first rotor 58A is rotated by the second rotor 62A. Thus the rotor 62A is configured with electromagnets 86A and 86B which receive the electrical current to vary the strength of the magnetic field 84 generated and in turn the strength or magnitude of the torque 90.

In the clutch 60 of FIG. 2, the second rotor 62 can be loaded tending to slow down or reduce its rotation rate relative to the rotation rate of the rotor 58 thereby causing or creating slip between the first rotor 58 and the second rotor 62 much like the slip experienced in a loaded induction motor. The slip and in turn the rotation rate of the second rotor 62 is thus controllable by varying the current supplied to the electromagnets which generate the magnetic field to interact with the related second rotor 62. The resulting torque is thus controlled so the user can regulate the rotation rate of the second rotor and thus the rotation rate of the second shaft 64. While the second shaft 64 is shown directly connected to drive the generator 68, it should be understood that, in some arrangements, the user may place various shaft connecting devices, thrust bearing and support bearings and even gearing arrangements to effect the rotation rate of the shaft for a particular installation.

To control the torque 90 (e.g., see FIG. 3), sensing means is provided to measure the rotation rate of the third shaft 64. As the third shaft 64 speeds up or slows down in relation to a preselected or desired speed or rate, a signal reflective of the actual rate is detected and sent to a comparator which in turn generates an error signal to regulate the interaction between the first element and the second element and in turn the torque thereby generated. The sensing means can be any suitable rotation rate monitor including optical, mechanical and electrical devices associated with the third shaft 64 to measure the rotation rate and send a signal reflective of (e.g., proportional) the rotation rate of the third shaft 64. Alternately, the sensing means can be an electrical frequency sensor 74 connected to receive power from the output conductors 70 and 72 supplying electrical power from the synchronous generator 68. The frequency sensor 74 sends a signal reflective of the electrical frequency via a conductor 114 to a comparator 78. The comparator 78 is any device that is configured to compare the incoming signal reflective of frequency with a desired frequency and generate an error signal, control signal or an adjust signal which is then supplied via a conductor 80 to adjusting means that operates to adjust the interaction between the first element and the second element or first rotor 58 and second rotor 62. While such means may be electrical as hereinafter discussed, the adjusting means may also be an electromechanical adjusting mechanism. If the sensing means senses the rotation rate of the shaft 64 by, for example, mechanical or optical means, the signal is supplied to a comparator like comparator 78 which then delivers the adjust, control or error signal to regulate the torque being delivered to the shaft 64 by the clutch 60.

In FIG. 2, the adjust signal 97 is supplied by conductor 80 to a reversible motor 96. The adjust signal 97 may be a positive or a negative signal and preferably is an electrical signal and more preferably a voltage that is supplied at two levels so that the larger may be deemed to be the positive and the smaller is the negative. As so configured, the adjust signal 97 is supplied to vary the current delivered to the electromagnets like magnets 86A and 86B and in turn vary the strength of the magnetic field like magnetic field 84 (FIG. 3) and in turn the magnitude of the torque 90 and the rotation rate of the output shaft like shaft 64 in FIG. 2.

As seen in FIG. 2, the torque delivered to the output shaft 64 can be varied by moving the second rotor 62 relative to the first rotor 58, or vice versa. This can be caused mechanically by motor 96 which is configured to rotate in a first direction upon receipt of a positive signal and in a second or reverse direction upon receipt of a negative signal 97 from the comparator 78. The motor 96 is connected to drive a worm gear 98 that is threaded into a threaded housing 100. As the worm gear 98 rotates in the first direction, the threaded housing 100 moves outward 102 along the worm gear 98. As the worm gear 98 rotates in the second direction, opposite to the first direction, the threaded housing 100 moves along the worm gear 98 inwardly 104 toward the motor 96.

In FIG. 2, the threaded housing 100 is attached to a base 106 to which the bearing support 66 is attached to support the third shaft 64. One or more generator bearing supports such as generator bearing support 108 contain bearings that support the synchronous electrical generator 68. The engagement slide or base 106 is suitably supported to be moveable outward 102 and inward 104. For example, the base 106 may be mounted on suitable roller bearings positioned to support the base 106 or on a suitable supporting structure so that it can easily move. The base 106 is also positioned so it remains essentially level or planar. While the base 106 is shown positioned to support the generator 68 and the second rotor 62 of the clutch 60, it may also be positioned to support the rotor 58 and other structure, like bearing supports 48 and 54. In effect, support means is provided to support the third shaft 64, and such support means is mechanically movable relative to support means supporting the second shaft 52.

As the motor 96 operates and rotates, the worm gear 98 moves to urge the base 106 inward 104 with a negative adjust signal and outward 102 with a positive adjust signal thereby causing the second rotor 62 to move toward and over the rotor 58 and away from around the rotor 58, respectively. In turn, the electromagnetic interaction between the first element or first rotor 58 and the second element or second rotor 62 is increased with a positive signal and decreased 104 with a negative signal. The total torque to rotate the second rotor 62 is thereby varied. As the second rotor 62 moves over the first rotor 58, the electromagnetic interaction increases thereby increasing the torque. The rotation rate of the shaft 64 and, in turn, the generator 68 is increased, all to maintain the rate of shaft 64 essentially constant and to maintain the frequency of the power supplied by the generator 68 at output 70 at a stable frequency. In other words, if the load on conductors 110 and 112 downstream of the sensor 74 increases, the frequency of the electrical power will start to drift down from a preselected frequency. Similarly, the rotation rate of the second shaft 64 will reduce. In turn the comparator 78 sends a signal reflective of the decreasing frequency or rotation rate via conductor means 80 to cause the motor 96 to operate to drive the worm gear 98 and drive the second rotor 62 toward 102 the rotor 58.

When the load supplied by the output conductors 110 and 112 decreases, the generator 68 tends to speed up and the frequency of the power at the output 72 and 70 goes up. The sensor 74 detects the increased frequency and sends a signal reflective of the increase in frequency to the comparator 78. The comparator 78 in turn generates an adjust signal that causes the motor 96 to rotate in the second direction to cause the worm gear 98 to rotate and in turn move the second rotor 62 in the direction 104 away from the first rotor 58. In turn the electromagnetic interaction between them decreases thereby reducing the torque and reducing the rotation rate of the third shaft 64 and the frequency of the output power supplied on the output conductors 70 and 72. The same result is obtained by sensing the rotation rate of the shaft 64 and supplying that signal to the comparator 78.

Figure 4:
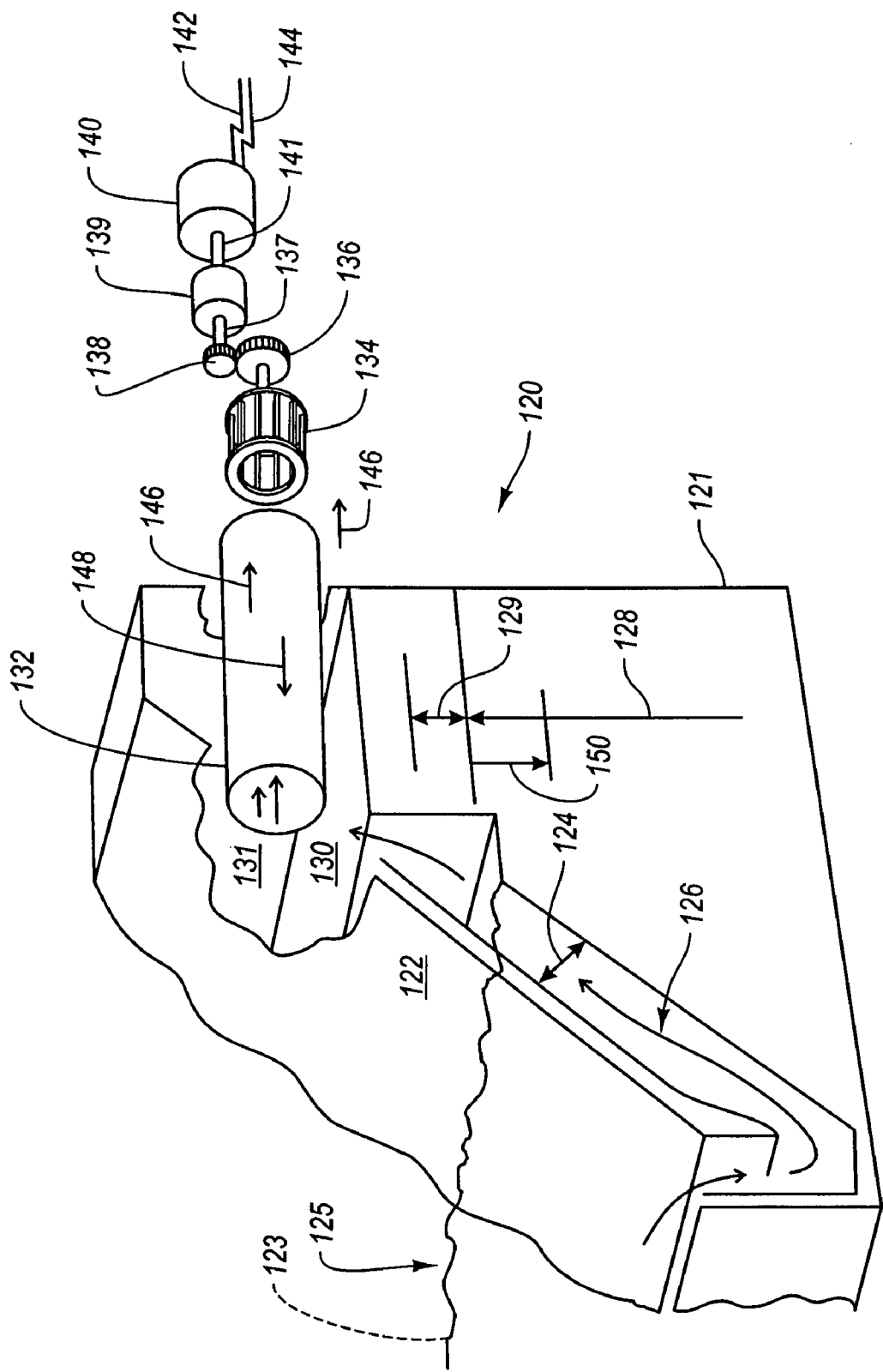
FIG. 4 is a simplified depiction of a wave generator or wave turbine system of the present invention.

Turning now to FIG. 4, one form of wave generator 120 is shown. Base 121 is constructed on a coast line with a front ramp 122 spaced away a distance 124 selected to create a venturi effect for water being urged up the slot 124 between the base 121 and the front ramp 122. Water has an average height 128 based on tides and other natural phenomenon. Waves 125 formed on the surface 123 of the water create a temporary increase 129 in height 128 comparable to wave height. The increased pressure of the water as a result urges or forces water up the slot 126 and into a chamber 130 which is full of air. The air is thereby compressed and urged out of the chamber 130 through a duct 132 which has a fan, propeller or air turbine 134 positioned to be rotated by the moving air. The fan, propeller or air turbine 134 is connected to a bull gear 136 that is connected to drive pinion 138 within a gear box much like the gear box 50 of FIG. 2. The pinion gear 138 is connected to the first element or the second element of an electromagnetic clutch 139 much like the electromagnetic clutch 60 of FIG. 2. The clutch 139 is further connected to a synchronous generator 140 which supplies electrical power over output conductors 142 and 144. The frequency of the output power may vary so that the first element or second element of the clutch 139 move relative to each other with one being on a base much like base 106 and moveable relative to the structure supporting the shaft 137 much like base 106 moves relative to the supports 48 and 54 of FIG. 2. Alternately the power supplied to electromagnets in the clutch 139 can be varied to vary the electromagnetic coupling comparable to FIG. 2.

The fan or air turbine 134 may be configured to operate with air flowing out 146 of the chamber 130 and with the air flowing back into the chamber 130 as the wave subsides and the water level moves from the increased height 129 typically to a height 151 below the water level 123. Subsequent waves produce a similar compression and decompression of air in the chamber 130 in turn causing the air or wind turbine 146 to rotate to in turn rotate gears 136 and 138 and in turn rotate the first element and the second element of the clutch 139. That is, the pinion 138 is connected to one of the first rotor and second rotor of clutch 139. The output shaft 141 is connected to supply torque from the other rotor to rotate generator 140 at a substantially constant rotation rate to maintain the power at the output 144 and 142 at a stable frequency.

Figure 5:
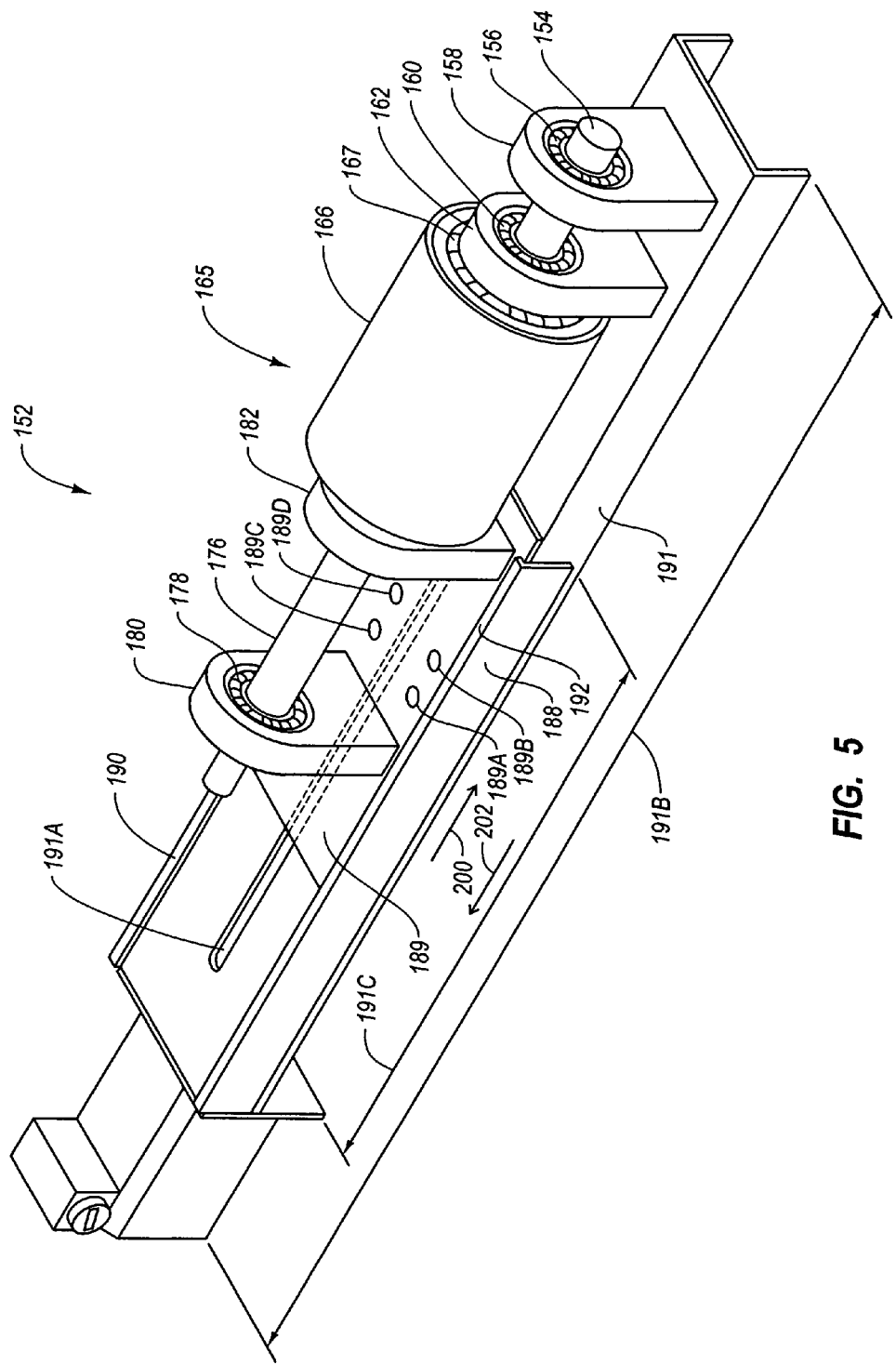
FIG. 5 is a simplified perspective of a clutch of the present invention for use with a variable speed prime mover.

FIGS. 5 and 6 show a clutch system 152 of the type that may be used in the systems of FIGS. 1, 2 and 4 as well as in other systems in which input power is delivered by a shaft that rotates at rates that vary over time while the rotation rate of the output shaft is essentially constant. That is, the rotation rate of the output shaft may vary slightly above or slightly below a preselected rotation rate (e.g., plus or minus about 10 percent of the preselected rotation rate) as work or load is delivered by the output shaft. Even though the rotation rate of the shaft delivering input power from, for example, a propeller, will vary widely, gearing arrangements and other devices are used so that the rotation rate of the input shaft such as shafts 52 (FIG. 2), 137 (FIG. 4) and 154 (FIG. 5) always exceeds the rotation rate of the output shaft such as shafts 64 (FIG. 2), 141 (FIG. 4) and 176 (FIG. 5). That is, the rotation rate from, for example, a propeller may vary from zero to speeds in excess of that desired for the output shaft so that some systems may employ inertia clutches or similar mechanisms to disengage below a certain rotation rate and above a certain rotation rate to stay within practical design limits and to avoid mechanical damage to components from over-speed conditions.

As shown in FIGS. 5 and 6, input power comes from a prime mover or other suitable power source via an input shaft 154 supported by support means such as one or more bearings like shaft bearing 156 positioned in shaft support 158 and clutch bearing 160 positioned in clutch bearing support 162. The shaft 154 is connected to a first rotor 164 of clutch 165; and, in turn, the first rotor 164 rotates with the shaft 154. The shaft 154 is formed from a suitable material (e.g., steel, steel alloys) and is sized to support the first rotor 164 with minimal or nominal sag or droop. That is, the first rotor 164 is essentially cantilevered at the clutch bearing support 162; and thus the rotor 164 will sag or droop 172 to a position shown in dotted line in which the center line 168 of the first rotor 164 droops below the axis 170 of the shafts 154 and 176 as shown in dotted line in FIG. 6. The materials of construction of the shaft 154 and the first rotor 164 are selected so that the sag or droop 172 is nominal and may even be less than 1 millimeter in some preferred configurations.

The second rotor 166 is here configured with a cylindrical opening 167 to receive the rotor 164 therewithin. The first rotor 164 is sized to fit within the second rotor 166 and to rotate therewithin without contacting the second rotor. The first rotor 164 is configured to be a traditional squirrel cage rotor to interact with the second rotor 166. Of course the second rotor 166 is configured with an electromagnet and to receive an electrical current to generate a magnetic field to magnetically interact with the first rotor 164. The electromagnetic interaction between the first rotor 164 and the second rotor 166 produces a torque that causes the second rotor 166 to rotate. The second rotor 166 in turn drives shaft section 174 connected to an output shaft 176 that is supported by at least one or more output shaft bearings in like bearing 178 mounted in output shaft bearing supports like output shaft bearing support 180. The second rotor 166 and output shaft 176 are also supported by a rotor bearing retained in a rotor bearing support 182. While electromagnets are typically used with the second rotor 166 to create the desired magnetic field, it should be understood that in some installations, permanent magnets may be used.

The output shaft 176, the shaft section 174 and the second rotor 166 are sized and fabricated from suitably strong materials like steel or other metal alloys so that the rotor 166 experiences only a minimal droop or sag 186 at its distal end 184 of an amount that is comparable to the droop or sag 172 of the first rotor 164. In FIG. 6, the droop or sag 172 and 186 is shown substantially enlarged only for purposes of illustration.

The output shaft bearing support 180 and rotor bearing support 182 are each mounted to or secured to a movable plate 189. Brackets 188 and 190 are "L" shaped with a lip 192 overlapping the plate 189 to retain the plate 189 snuggly but slideably to the support frame 191. The movable plate 189 has a threaded housing 194 fixedly attached to it by bolts 189 A-D or by any other suitable means such as welding, brazing, glue or the like. The housing 194 extends through support frame 191 through slot 191A which extends along the length 191B a distance 191C selected so that the first rotor 164 and the second rotor 166 are movable between a fully engaged (one fully within the other) and a fully disengaged position (one fully removed from the other). Thus rotation of the worm gear 196 by reversible motor 198 causes the movable plate 189 to move outward 200 upon rotation of the worm gear 196 in a first direction and inward 202 upon rotation of the worm gear 196 in a second direction opposite to the first direction. In turn, the second rotor 166 is urged outwardly 200 towards the rotor 164 thereby increasing the magnetic interaction between the first rotor 164 and the second rotor 166 and increasing the torque being generated. In turn the rotation rate of the output shaft 176 increases to match a corresponding increase in demand so that the rotation rate of the output shaft 176 tends to remain essentially constant.

Similarly, upon movement of the worm gear 196 in the second direction opposite to the first, the movable plate 189 moves inwardly 202 thereby moving the second rotor 166 away from the first rotor 164. The electromagnetic interaction between the first rotor 164 and the second rotor 166 is thereby decreased and the torque produced is decreased. In turn, the speed or rotation rate of the output shaft 176 tends to remain constant for a decreasing load on an attached machine like a synchronous generator.

The reversible motor 198 operates to rotate the worm gear 196 in a first direction and in a second direction opposite to the first direction in accordance with signals it receives from a suitable comparator (like comparator 78 of FIG. 2) that supplies appropriate electrical signals from a sensor arrangement that receives signals reflective of shaft 176 speed and compares them to a preselected, desired, standard or constant speed signal and generates error signals which cause the reversible motor to rotate in the first direction and in the second direction to maintain the shaft 176 at the preselected, desired, standard or constant speed.

It should be noted that the threaded housing 194 is connected to the plate 189 through the slot 191A formed in the support frame 191 to thereby move the second rotor 166 over and away from the first rotor 164. Alternately, the worm gear could be connected to the support frame 191 to move it relative to the plate 189. Alternately, the second rotor may be configured to fit within the first rotor. Thus, it should be apparent that any mechanical arrangement by which the first rotor and the second rotor may be moved relative to each other will be suitable to effect a change in the magnetic interaction between the first rotor and the second rotor and in turn a change in the torque to maintain the rotation rate of the output shaft 176 at a desired rotation rate.

FIG. 7 shows an alternate arrangement for moving the movable plate 204 comparable to movable plate 189. A hydraulic actuator 206 operates to drive a piston shaft 208 inwardly and outwardly 212. The distal end 214 of the piston 208 is connected to a bracket 210 by any suitable means (e.g., bolts, nuts, set screws, pins, welding, brazing, glue) to effect a positive connection and to receive the forces necessary to move the movable plate 204 inwardly and outwardly 212. A reversible motor 216 is connected to drive a reversible hydraulic pump 218 which in turn supplies hydraulic fluid under pressure via lines 220 and 222 to urge an internal piston within the actuator 206 to move. The piston is connected to the piston shaft 208 to urge the movable plate 204 to move inwardly and outwardly 212 to thereby change the torque generated by the interaction of the first rotor and second rotor comparable to that discussed in connection with FIGS. 2 and 3. The motor 216 receives signals via conductor 224 to operate in one direction or the other from a comparator comparable to comparator 78 in FIG. 2. Alternately, electrically controlled valves can port pressurized fluid to one side or the other of the piston.

In FIG. 8, a movable plate 226 is shown with a gear rack 228 attached thereto sized to drivingly connect to a gear or pinion 230 that may be driven by a suitable stepper motor or by a reversible motor comparable to motor 216 connected to receive signals to vary the relationship of the first rotor and the second rotor (not shown) to maintain the output shaft at an essentially constant speed. In turn the movable plate 226 is urged to move inwardly and outwardly 232 like movable plate 189 to vary the torque generated by the electromagnetic interaction of the first rotor and the second rotor. Indeed, even a suitable solenoid may be connected to urge the plate 226 to move relative to a plate like plate 189.

As discussed in connection with FIG. 3, the clutch has a second rotor 62A and a first rotor 58A that are each configured to electromagnetically interact to generate a torque. While the interaction is controlled by moving the first rotor and the second rotor relative to each other as hereinbefore discussed, the interaction may also be varied electrically. That is, if a magnetic field is generated using electromagnets, then the electrical current supplied to the electromagnet can be varied to vary the strength of the magnetic field generated by the electromagnet and in turn magnitude of the torque. In turn, the driving element, like the first rotor, will cause the second or driven rotor, to rotate in the same direction but at a rotation rate selected by the user by varying the electromagnetic interaction between the first rotor and the second rotor.

Figure 9:
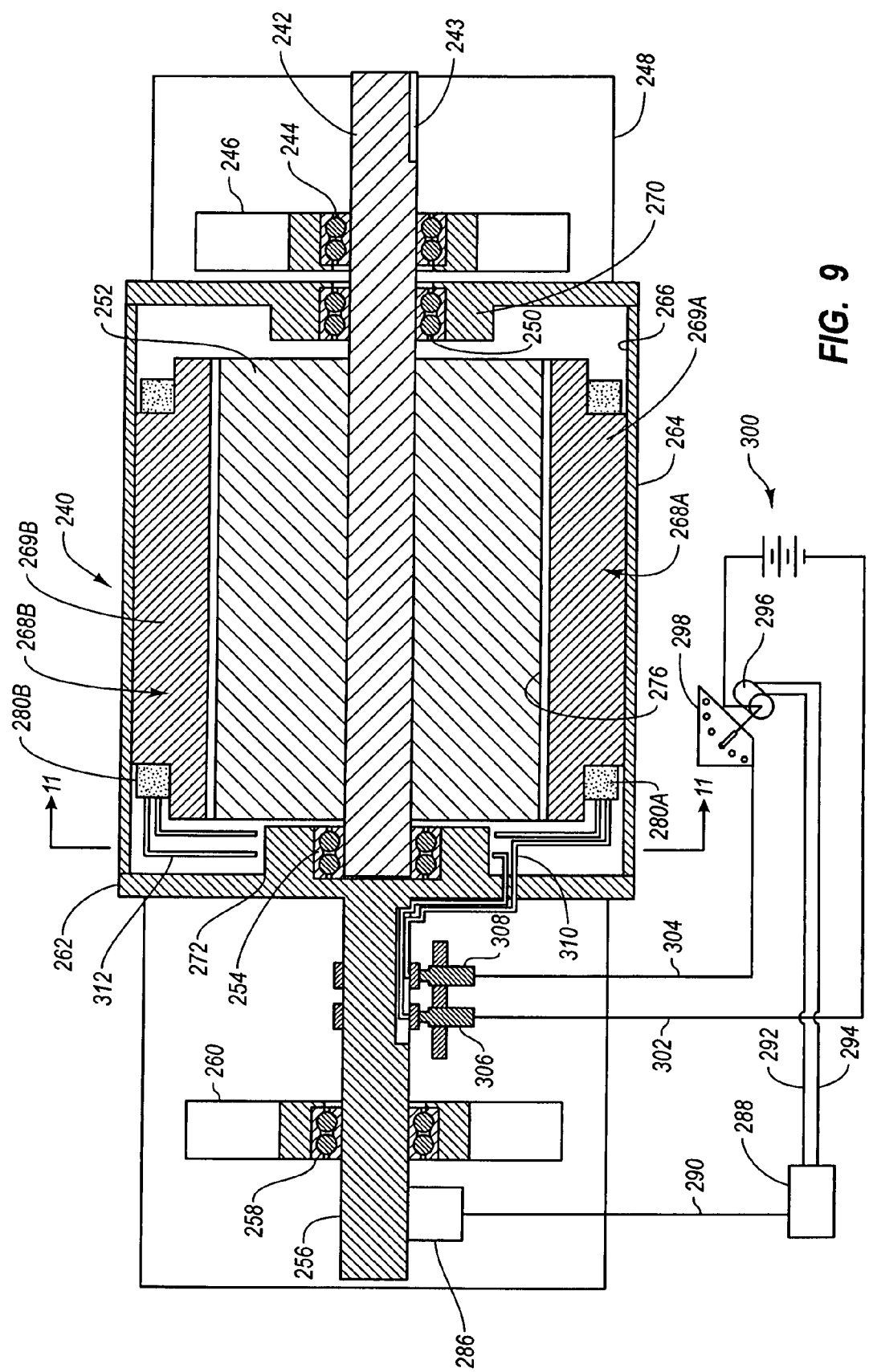
FIG. 9 is a simplified top cross sectional view in section of an alternate clutch of the present invention for use with a variable speed prime mover.

In FIG. 9, a clutch 240 is shown. It receives input power or energy via a rotatable shaft 242 that is here shown connectable to extensions thereof or to a suitable pinion gear by use of a suitable key connection insertable in a key way 243. The shaft 242 thus receives power or torque from a prime mover that causes the rotatable shaft 242 to rotate at rotation rates that vary over a period of time. The rotatable shaft 242 is supported by a rotor bearing 244 that is held in a rotor bearing support 246. The rotor bearing support 246 is mounted to a bed 248 provided to support the clutch 240. The rotatable shaft 242 extends through a rotor bearing 250 and through a rotor 252 and into an internal rotor bearing 254. The rotor 252 is fixedly secured to the rotatable shaft 242 and therefore rotates with the shaft 242 at rotation rates that vary over a period of time.

The output shaft 256 extends through a rotor bearing 258 retained in and supported by a rotor bearing support 260 that is attached to and supported by the bed 248. The shaft 256 extends from and is connected to the second rotor 262. The shaft 256 may be welded, brazed, bolted, keyed or attached in any other suitable way to the second rotor 262 so that rotation of the second rotor 262 causes rotation of the shaft 256. The second rotor 262 is a cylindrical housing 264 sized to surround the first rotor 252 and to receive the rotor bearing 250 in a suitable bearing receptacle 270 and the internal rotor bearing 254 in another suitable bearing receptacle 272.

The interior surface 266 of the second rotor housing 264 has a plurality of electro magnets 268A and 268B each made from a combination of electrical conductors or windings 280A and 280B surrounding magnetic material 269A and 269B such as a laminated iron material. Each of the electromagnets 268A and 268B are mounted to generate a magnetic field for interaction with the first rotor 252. As better seen in FIG. 10, a portion of the first rotor 252 and the second rotor 262 are enlarged and shown with the gap 271 substantially enlarged to illustrate a magnetic field 278 being provided by the electromagnets 268A and 268B of the second rotor 262 that interacts with the rotor 252. That is, the second rotor 262 has magnets 268A and 268B that generate a magnetic field 278 that interacts with the first rotor 252 to electromagnetically generate a torque 284 to cause the first rotor 252 to rotate.

Figure 10:
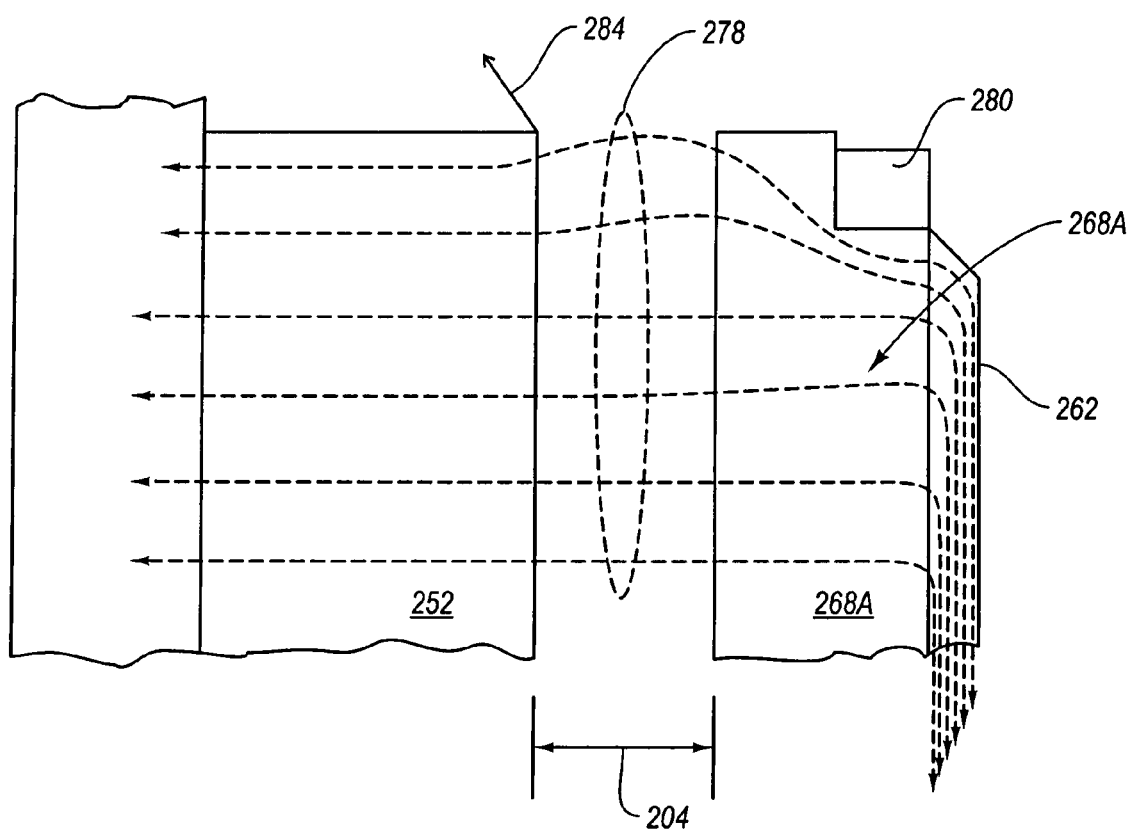
FIG. 10 is a simplified cross sectional side view of portions of the clutch of FIG. 9 depicting magnetic fields.

The second rotor 262 rotates relative to the first rotor 252; and thus the neither the first rotor 252 nor the second rotor 262 are stationary. Both rotate, but one faster than the other. The electromagnets 268A and 268B extend around the interior surface 266 of the second rotor 262 and generate the magnetic field 278 which varies with the amount of electrical power supplied to a suitable winding 280A and 280B or coil associated with the electromagnets 268A and 268B as well as the reluctance of the iron in the rotors and the reluctance of the air gap 271. As the first rotor 252 is rotated by the shaft 242, the first rotor 252 electromagnetically interacts with the second rotor 262 creating a torque 284 that urges the second rotor 262 to rotate in the same direction. The result is the transfer of mechanical energy from the rotatable shaft 242 to the output shaft 256. In FIG. 10, it should be understood that the torque obviously cannot be seen and is essentially normal to the lines of force of the magnetic field 278. In turn, the torque for the arrangement of FIG. 10 would be more correctly shown directed into the page or out of the page based on the direction of rotation of the rotor 252 and the rotor 262.

It also should be understood that with a load on the output shaft 256, the torque 284 being generated will be insufficient to keep the second rotor 262 rotating at the same speed as the first rotor 252. As a result, the second rotor 262 will start to rotate slower inducing what is sometimes referred to as slip. As the load increases the slip will increase leading to a reduction in the rotation rate of the second rotor 262 and the shaft 256. A sensor 286 positioned to sense the rotation rate of the shaft 256 detects the rotation rate and supplies it to a processor or comparator 288 via conductor 290. The processor or comparator 288 compares the incoming signal reflective of the rotation rate of the shaft 256 with a standard. If the rotation rate is less than the standard, the comparator 288 sends a signal via conductors 292 and 294 to a stepper motor 296 which operates a variable resistor 298 to lower the resistance to thereby increase the current supplied by a power source such as battery 300. The current supplied from the power source proceeds via conductors 302 and 304 via brush assemblies 306 and 308 which in turn supplies current via conductors 310 and 312 to the windings 280A and 280B. In turn a stronger magnetic field 278 is created and in turn the torque 284 (FIG. 10) is larger or stronger so that the slip is reduced thereby causing the speed of the shaft 256 to increase.

Similarly, if the detector 286 detects an increase of the rotation rate of the shaft 256, the signal to the stepper 296 causes the variable resistance 298 to increase thereby reducing the current or power to the winding 280 in turn reducing the strength of the magnetic field 278 leading to more slip and a slower rotation rate of the shaft 256. In turn, it can be seen that the shaft 256 will be controlled to operate at a substantially constant rotation rate determined by the standard set into the comparator 280. Further, it can be seen that the rotation rate of the shaft 256 is maintained essentially constant independent of the rotation rate of the rotatable shaft 242 and independent of the load applied to the shaft 256 within the power range or capability of the clutch 240.

Figure 11:
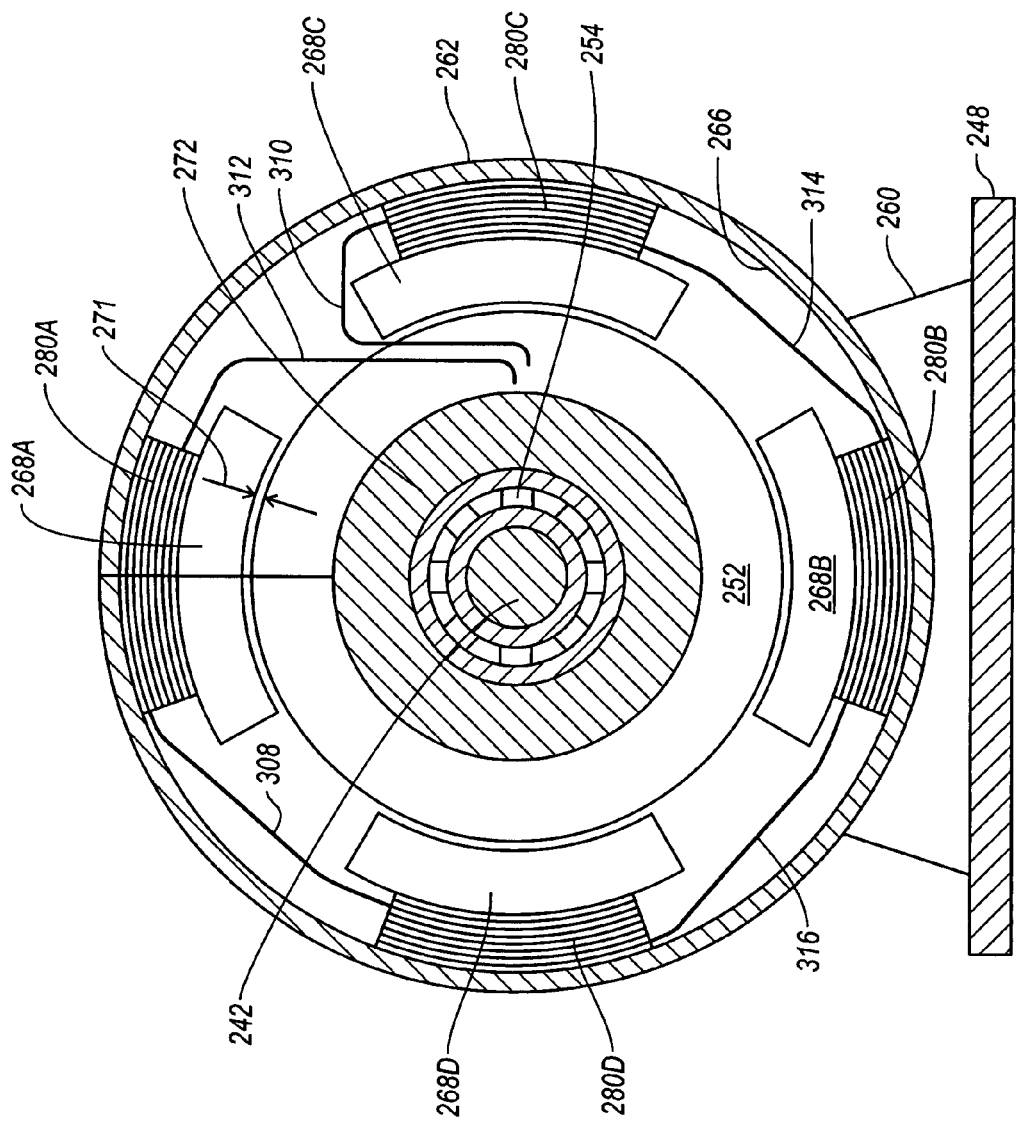
FIG. 11 is a cross sectional view of the clutch of FIG. 9 at section lines 11-11.

The clutch 240 of FIG. 9 is seen at section lines 11-11 in FIG. 11. The separate windings 280A, 280B, 280C and 280D are each shown on association with electromagnets 268A, 268B, 268C and 268D. The separate conductors 310 and 312 supply power to the windings 280A, 280B, 280C and 280D to vary the strength of magnetic fields generated or provided by the electromagnets 268A, 268B, 268C and 268D. Each of the separate windings 280A, 280B, 280C and 280D are interconnected by conductors 314, 316 and 318 because the windings are electrically in series. Alternately, the windings may be electrically connected in parallel as desired for particular installations. Although the drawings are not to scale, the gap 271 is in reality quite small. Indeed, because the shaft 242 is supported by internal rotor bearing 254 and because the second rotor 262 is in effect supported by rotor bearing 250, there is no sag or droop of note and in turn the gap 271 can be narrowed to be quite small (e.g., 5 mm or less).

Figure 12:
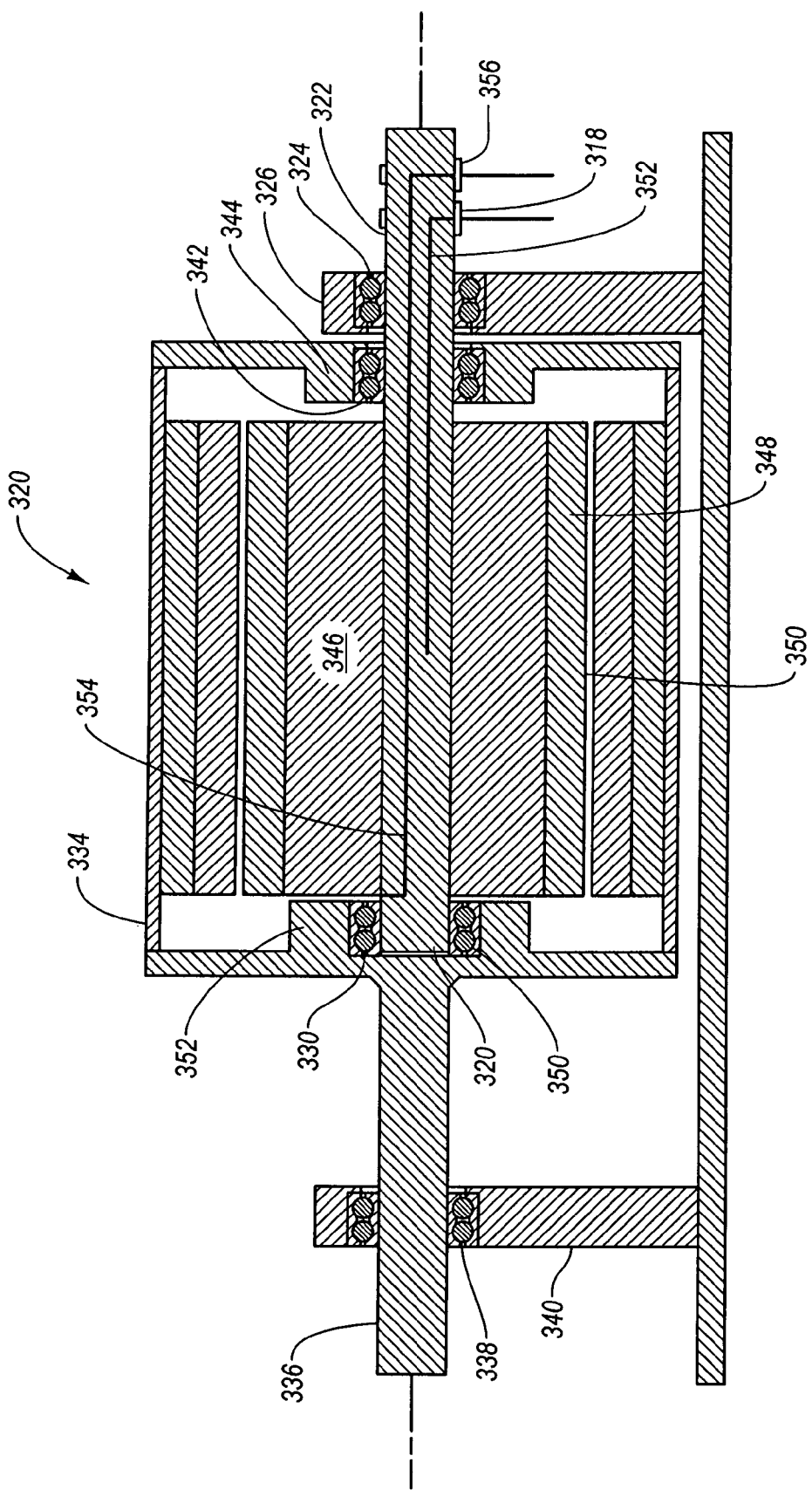
FIG. 12 is a simplified side cross sectional view in section of an alternate clutch of the present invention.

In FIG. 12, a clutch 320 is here shown to have an input shaft 322 supported by shaft bearing 324 in bearing housing 326. The distal end 328 of the shaft 322 is supported by an internal rotor bearing 330 mounted in a receptacle 332 formed in the second rotor 334. The second rotor 334 is connected to drive an output shaft 336 which is supported by a shaft bearing 338 mounted in a suitable bearing support 340. The second rotor 334 is also supported by a rotor bearing 342 retained in bearing receptacle 344. The first rotor 346 is attached to input shaft 322 and is driven thereby. In FIG. 12, a plurality of electromagnets 348 are positioned about the exterior surface 350 of the first rotor 346 and are connected by conductors 352 and 354 through brushes 356 and 358 to a variable source of electrical power to vary the strength of the magnetic field and in turn to regulate the torque and in turn to maintain the output shaft 336 at an essentially constant speed.

Comparing FIGS. 9 and 12, it can be seen that in both a first rotor and a second rotor may be configured to receive electrical current to vary the magnetic field and in turn the torque generated by the interaction of first rotor and the second rotor. That is, different constructions of the clutches of the invention may have an electrically controlled magnetic field for the first rotor, the second rotor or both. In such arrangements, the underlying frame structure need not have moving components like the moveable plate 189, the worm gear 196, drive motor 198 and other structure (FIG. 6) to cause the first rotor to move relative to the second rotor to vary the electromagnetic field. Rather, the use of various means to vary the electrical current will also be suitable.

Figure 13:
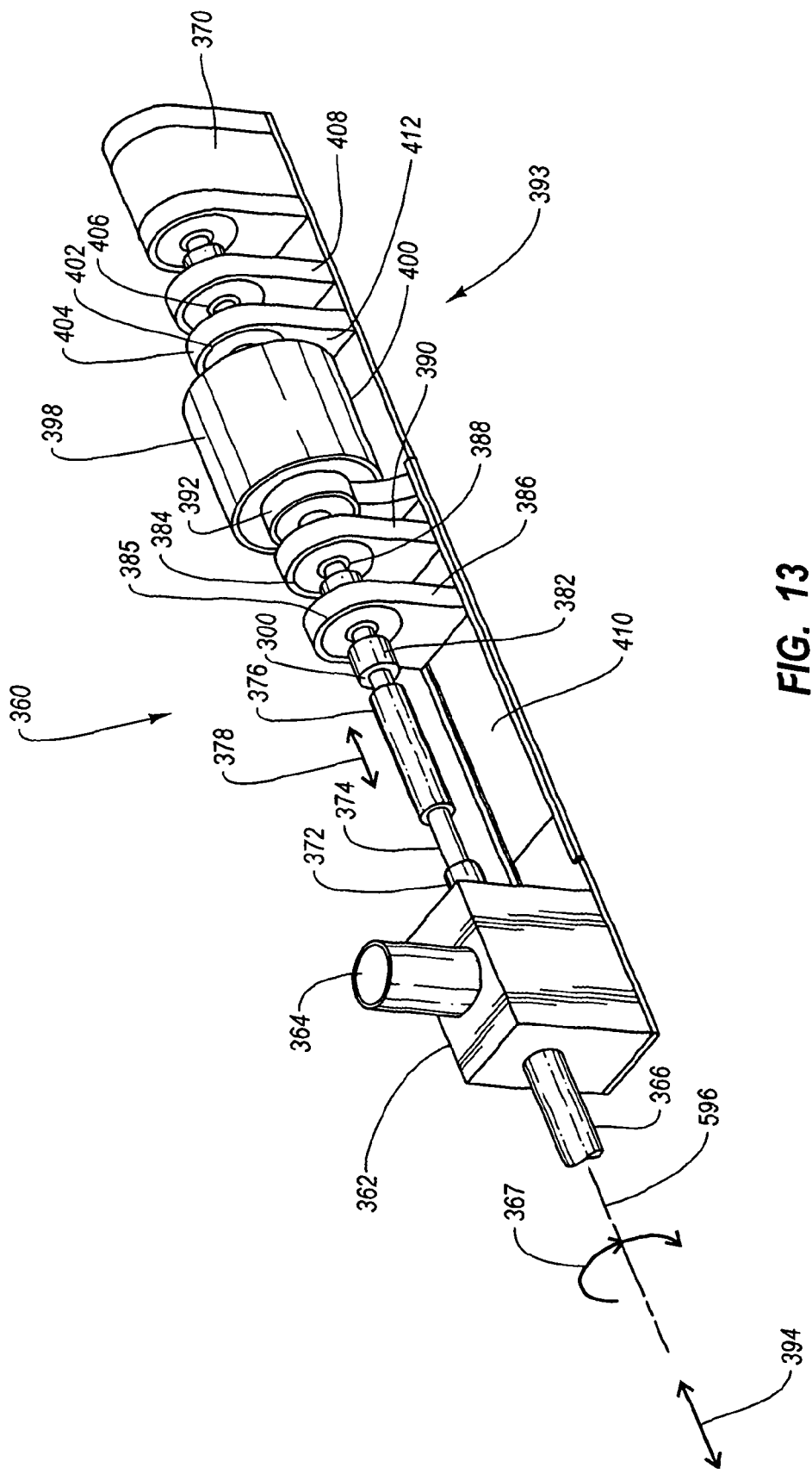
FIG. 13. is perspective depiction of an alternate arrangement of the invention.

Turning to FIG. 13, a system 360 has a gear box 362 which may be in any appropriate form to convert rotational torque received from a prime mover that operates at varying rotation rates to a suitable rotation rate for driving a generator 370 as hereinafter discussed. While the rotation rate of the input from the prime mover may be constant for a period of time (e.g., one minute to several hours), the rotation rate 367 will vary over time. As hereinbefore discussed, the prime mover may be the propeller of a wind mill or wind turbine, or any device or system that can generate rotational torque. For example, in FIG. 13, the gear box 262 may receive rotational torque from the vertical shaft 364 of a windmill or the horizontal shaft 366 may be connected to the propeller of a wind turbine. The gear box 362 is configured with gears as necessary for a particular installation in any suitable way to supply rotational torque through a driving shaft 372. The driving shaft 372 is keyed to drive a shaft spline gear 374 that is coupled to a spline sleeve 376. The spline gear 374 and spline sleeve 376 have axial teeth that drivingly engage while allowing for axial movement 378 of the spline gear 374 relative to the spline sleeve 376.

In some installations, the spline sleeve 376 is connected to a shaft 380 which also may be a spline gear to provide for more stability of the sleeve 378. However in this embodiment the shaft 380 is fixedly connected to the spline sleeve 376 at one end and at its other end to a coupling 382 provided to take into account small changes in dimension found in mechanical installations. The flexible coupling 382 is connected to input shaft 384 that is supported by an input shaft bearing 385 mounted in a bearing support 386. The input shaft 384 extends through a rotor bearing 388 mounted in a rotor bearing support 390 to a first rotor 392 of clutch 393 positionable axially 394 along the axis 396 in the second rotor 398. The second rotor 398 and the first rotor 392 of the clutch 393 are configured to electromagnetically interact to and generate a torque that causes the second rotor 398 to rotate relative to the first rotor 392. The second rotor 398 is connected to an output shaft that is supported by rotor bearing 402 mounted in rotor bearing support 404 and by output shaft bearing 406 retained in shaft bearing support 408. The number of bearings and bearings supports will vary based on a variety of different factors related to each installation including the length of the various shafts and materials of construction. The arrangement of FIG. 13 is for generation of synchronous electrical power at a suitable frequency like 50 Hz or 60 Hz with the synchronous generator 370 being sized consistent with the power available from the prime mover. Similarly, the second rotor 398 and first rotor 392 are sized so that frequency or constant output shaft rotation rate can be maintained or the output electrical power frequency can be maintained for given input power from the prime mover.

The installation of FIG. 13 shows the first rotor 392 moveable relative to the second rotor 398 to vary the torque. The rotor 392 is moved by moving the underlying support plate 410 on the supporting frame 412 by any suitable means including those hereinbefore discussed in connection with FIGS. 5, 6, 7 and 8. Alternately, the first rotor 392 and second 398 can be fixed and be of the type in which the magnetic fields of either or both are varied to vary the torque delivered to the output shaft. Notably, the installation depicted in FIG.

13 may be sized to be used with a suitable propeller as a wind turbine system to supply power into a suitable collector and distribution grid without the need to convert to a suitable frequency.

In several of the embodiments, one of the rotors may be described as having electromagnets such as electromagnets 268A-D (FIG. 11). In some installations, permanent magnets may be used in lieu of electromagnets. However, with the use of permanent magnets, the strength of the magnetic field remains essentially fixed. Thus the rotors will need to be moved relative to each other or alternate means used to vary the magnetic field by, for example, adding or subtracting magnets, or increasing and decreasing the air gap.

In embodiments like that of FIG. 13, the installation is depicted in what can be regarded as a general horizontal configuration with the axis 396 in a general horizontal orientation. However, it should be understood that the shaft axis 396 may be vertical or at some other orientation as desired by the user.

When embodiments such as the one seen in FIG. 13 are connected to a large power grid, the clutch like clutch 393 is not able to effect speed control. The power on the grid will typically be regarded as "stiff" or very stable in frequency. The generator is so small when associated with a wind turbine (for example) that it will in essence have no ability to affect a speed change creating a grid frequency change. As the prime move side spins faster than the generator side (slips ahead), torque will be transferred to the generator shaft. The generator power angle will then increase, and power will be forced onto the grid. So, the clutch in such cases is typically being used for torque or power control. Constant speed control is really only imposed in those configurations when the turbine is operating alone, or in a group where the output of the generator is able to effect some form of frequency change on the group or in effect, on a small grid.

It should also be noted that the several embodiments herein described involve what has been denominated as a clutch. A clutch in this application refers to a device or a structure to effect energy transmission.

Those skilled in the art will recognize that the embodiments described herein are not intended to limit the scope of the invention which are defined by the terms of the claims that are appended hereto.

What is claimed is:

1. A clutch for interconnecting a first machine through a first shaft which is rotatable at variable rotational rates and a second machine though a second shaft, said second shaft being rotatable at a controllable rotational rate, said clutch comprising:
a first shaft rotatable at variable rotation rates;
a first rotor connected to said first shaft for rotation at variable rotation rates by said first shaft, said first rotor being configured to be one of a first element and a second element of an electrical machine;
a second shaft rotatable at a controllable rotation rate;
a second rotor connected to said second shaft to rotate said second shaft at said controllable rotation rate, said second rotor being configured to be the other of said first element and said second element of said electrical machine, said first element and said second element each being configured electrically and mechanically for one to rotate relative to the other to generate a torque to urge said second rotor to rotate;
a source of electrical power connected to one of said first element and said second element to supply an electrical current thereto;
torque varying means connected to one of said first rotor, said second rotor and said source of electrical power to vary said torque;
sensing means positioned and configured to sense the rotation rate of said second shaft, said sensing means being configured to supply a second shaft rate signal reflective of said rotation rate of said second shaft; and
control means connected to said sensing means to receive said second shaft rate signal and connected to said torque varying means to supply a control signal thereto to vary said torque, said control means being configured to compare said rotation rate of said second shaft received from said sensing means with said controllable rotation rate and to generate said control signal to cause said force varying means to vary said torque to urge said second shaft to rotate at said controllable rotation rate.

2. The clutch of claim 1 wherein said first rotor has a first length, wherein said second rotor has a second length, and wherein said torque varying means includes positioning means operable to vary the position of said first rotor and said second rotor relative to each other along their respective first length and said second length to vary said torque.

3. The clutch of claim 1 wherein said first element includes electromagnet means connected to receive said electrical current from said source for generating a magnetic field to magnetically interact with said second element.

4. The clutch of claim 3 wherein said torque varying means includes means to vary the electrical current supplied to said electromagnet means to vary said torque.

5. The clutch of claim 1 wherein said first machine is a prime mover and said second machine is a constant speed machine.

6. The clutch of claim 5 wherein said constant speed machine is a synchronous generator.

7. The clutch of claim 6 wherein said prime mover is a wind driven propeller system.

8. The clutch of claim 2 wherein said first shaft has a first shaft axis and said second shaft has a second shaft axis, and where said first shaft axis and said second shaft axis are the same axis.

9. A clutch for interconnecting a first machine having a first shaft rotating at variable rotational rates and a second machine having a second shaft rotating at a preselected rotational rate, said clutch comprising:
a first rotor having a length and connected to said first shaft, said first rotor being configured to be one of said first element and said second element of an electrical machine;
a second rotor having a length and connected to said second shaft, said second rotor being configured to be the other of said first element and said second element of said electrical machine, said first rotor and said second rotor being formed for one to be positionable into and out of the other and to be rotatable relative to each other to cause a torque to be generated to urge said second rotor and said second shaft to rotate;
positioning means connected to one of said first rotor and said second rotor for moving said first rotor and said second rotor relative to each other along their respective lengths;
sensing means to sense the rotational rate of said second shaft, said sensing means being configured to supply a second shaft rate signal reflective of said rotational rate of said second shaft; and
control means connected to said sensing means to receive said second shaft rate signal, said control means being configured to generate a positioning signal to cause said positioning means to position said first rotor and said second rotor relative to each other along their respective lengths to vary said torque to maintain the second shaft rotation rate at a preselected rotation rate, said control means being connected to said positioning means to supply said positioning signal thereto.

10. The clutch of claim 9, wherein one of said first rotor and said second rotor includes at least two permanent magnets.

11. The clutch of claim 9 wherein one of said first rotor and said second rotor includes electromagnet and means to receive power from an external source to generate a magnetic field to interact with the other of said first rotor and said second rotor.

12. The clutch of claim 9 wherein said first rotor is rotatably supported on a first base and said second rotor is rotatably supported on a second base, wherein said positioning means includes a bracket connected to one of said first base and said second base, wherein said positioning means includes a driving mechanism connected to said bracket and operable to move said first base and said second base relative to each other.

13. A clutch for interconnecting a first machine having a first shaft rotatable at variable rotational rates and a second machine having a second shaft for rotation at a substantially constant rotational rate, said clutch comprising:
a first shaft;
a first rotor having a length and connected to said first shaft, said first rotor being one of a first element and a second element of a rotating electrical machine;
a second shaft;
a second rotor having a length and connected to said second shaft, said second rotor being the other of said first element and said second element of said rotating electrical machine, said first element being formed to be circular in cross section with an external surface and said second element being formed to be circular in cross section with a cylindrical interior having an interior surface and an opening to rotatably receive said first element therewithin to generate a torque upon rotation of one of said first element and said second element relative to each other, said first element being sized in length to fit within said cylindrical space;
positioning means connected to one of said first rotor and said second rotor for moving said first rotor and said second rotor relative to each other along their respective lengths to vary said torque;
sensing means to sense the rotational rate of said second shaft, said sensing means being configured to supply a second shaft rate signal reflective of said rotational rate of said second shaft; and control means connected to said sensing means to receive said second shaft rate signal, said control means having means to compare said second shaft rotational rate received from said second shaft rotational rate signal with a preselected rotational rate and to generate a positioning signal to cause said positioning means to position said first rotor relative to said second rotor along their respective lengths to vary said torque to rotate said second shaft at substantially said preselected rotational rate, and said control means being connected to supply said positioning signal to said positioning means.

14. The clutch of claim 13 wherein said first shaft has a first shaft axis and said second shaft has a second shaft axis, and where said first shaft axis and said second shaft axis are the same axis.

15. The clutch of claim 14 wherein said first machine is a prime mover and said second machine is a synchronous generator.

16. The clutch of claim 15 wherein said second element and said first element fit snuggly together.

17. The clutch of claim 16 further including first shaft supporting means for supporting said first shaft and second shaft supporting means for supporting said second shaft.

18. The clutch of claim 17 wherein said positioning means is connected to said second shaft supporting means and is operable to move said second shaft and in turn said second rotor toward and away from said first rotor.

19. The clutch of claim 18 wherein said positioning means includes a motor connected to said control means to receive said positioning signal and a drive mechanism connected to be driven by said motor, said drive mechanism being attached to said second shaft supporting means to move said second shaft axially upon operation of motor.

20. The clutch of claim 18 wherein said positioning means includes a hydraulic pump configure to supply hydraulic fluid upon receipt of a positioning signal from said control means to either side of a piston rod of a hydraulic piston, said piston rod being attached to said second shaft supporting means, said hydraulic piston being operable to extend and retract said piston rod to urge said second shaft supporting means and said second rotor relative to first rotor.

21. The clutch of claim 19 wherein said drive mechanism is a screw rotatable by said motor and wherein said screw is attached to said second shaft supporting means.

22. The clutch of claim 17 wherein said drive mechanism is a rack connected to said second shaft supporting means and a pinion connected to said motor, said pinion being engaged with said rack to move said rack upon rotation of said motor.

23. The clutch of claim 16 wherein said sensing means is a shaft rate detector associated with said second shaft.

24. The clutch means of claim 16 wherein the first machine is a wind turbine.

25. The clutch means of claim 16 wherein the first machine is a water-powered turbine.

26. The clutch means of claim 16 wherein the control means is a programmable computer.

27. A clutch for drivingly connecting a driving structure and a driven structure, said clutch comprising:
driving structure for supplying rotational torque, said driving structure including one of a first element and a second element of an electrical machine;
driven structure for supply rotational torque, said being the other of said first element and said second element of said electrical machine, said first element and said second element being positioned relative to each other and operated to generate a torque to urge rotation of one relative to the other;
an external source of power connected to supply an electric current to one of said first element and said second element to generate a magnetic field to interact with the other of said first element and said second element to generate said torque;
adjusting means connected to one of said driven structure, said driving structure and said external source of power and operable to vary said torque;
sensing means to sense the value of said torque and configured to supply a force signal reflective of said torque; and
control means connected to said sensing means to receive said force signal, said control means having means to compare said force signal received from said force signal with a preselected torque signal and to generate a positioning signal to cause said adjusting means to vary said torque, said control means being connected to supply said positioning signal to said adjusting means.

28. A system for generating electrical power, said system comprising:
- a first shaft having a first end and a second end;
- a propeller system attached to the first end of said shaft and configured to be rotated by an external force at variable rotational rates;
- a second shaft having a first end and a second end;
- a clutch connected to the second end of said first shaft and to the first end of said second shaft, said clutch being configured to drivingly interconnect said first shaft to said second shaft, said clutch including
  - a first rotor connected to said second end of said first shaft to be rotated by said first shaft, said first rotor being one of a first element and a second element of an electrical machine,
  - a second rotor connected to said first end of said second shaft to rotate said second shaft, said second rotor being the other of first element and said second element of said electrical machine, said second element and said first element being positioned relative to each other mechanically to electrically interact to cause a torque to be generated to cause said first element to rotated relative to said second element to rotate to urge said second rotor to rotate,
  - a source of electrical power connected to supply an electrical current to one of said first element and said second element to generate a magnetic field to interact with the other of said first element and said second element to generate said torque,
  - torque adjusting means connected to one of said first rotor, said second rotor and said source of electrical power, said force adjusting means being operable to cause said torque to vary,
  - sensing means to sense the rotational rate of said second shaft, said sensing means being configured to supply a second shaft rate signal reflective of said rotational rate of said second shaft, and
  - control means connected to said sensing means to receive said second shaft rate signal, said control means being configured to compare said second shaft rate signal with a preselected rate signal to develop an adjusting signal, said control means being connected to said force adjusting means to supply said adjusting signal thereto to cause said force adjusting means to vary said torque to urge said second shaft to rotate at said preselected rotational rate; and
- a synchronous generator connected to said second end of said second shaft, said synchronous generator being configured to generate electrical power.

29. The system of claim 28 wherein said torque adjusting means is a regulating device connected to regulate the electrical current supplied by said source of electrical power to regulate said torque.

30. The system of claim 28 wherein said first shaft is supported by first shaft support means and said second shaft is supported by second shaft support means, and wherein said torque adjusting means is connected to one of said first shaft support means and said second shaft support means and operable to move said first shaft support means and said second shaft support means relative to each other to move said first element and said second element relative to each other to vary said torque.

31. The system of claim 28 wherein said propeller means includes is a wind driven propeller connected by a propeller shaft to a transmission to supply rotational torque thereto at a propeller rotation rate and wherein said first end of said first shaft is connected to said shaft transmission to receive rotational torque there from at a shaft rotation rate.

32. The system of claim 28 wherein the propeller means is driven by flowing water.

33. The system of claim 28 wherein the propeller means is a propeller or fan driven by air movement caused by waves moving into and out of a chamber.

34. A system for generating electrical power at a substantially constant frequency, said system comprising:
- a prime mover having a driving shaft rotatable at rotational rates that vary;
- a synchronous generator rotated by a driven shaft rotatable at a substantially constant rotational rate, said synchronous generator having an output connected to supply power at a substantially constant frequency; and
- a clutch for connecting said driving shaft to said driven shaft, said clutch including
  - a first rotor connected to said first shaft, said first rotor being one of a first element and a second element of a rotating electrical machine,
  - a second rotor connected to said second shaft, said second rotor being the other of said first element and said second element, said first rotor and said second rotor being positioned relative to each other for the first element and said second element to interact upon rotation of said first rotor to generate a torque to urge said second rotor to rotate,
  - a source of electrical power configured and connected to supply an electrical current to one of said first element and said second element to create a magnetic field to interact with the other of said first element and said second element to generate said torque;
  - torque varying means connected to one of said first rotor, said second rotor, and said source of electrical power and operable to vary said torque,
  - sensing means connected to the output of said synchronous generator to sense the frequency of the output power, said sensing means being configured to supply a detection signal reflective of said frequency of said out put power, and
  - control means connected to said sensing means to receive said detection signal, said control means being configured to compare said detection signal with a preset signal reflective of a desired frequency and operative to generate a control signal to cause said torque to vary to urge said second shaft to rotate at a shaft rate to generate electrical power at said desired frequency, and said control means being connected to said torque varying means to supply said control signal thereto.

35. A clutch for interconnecting a first machine through a first shaft which is rotatable at variable rotational rates and a second machine though a second shaft, said second shaft being rotatable at a controllable rotational rate, said clutch comprising:
- a first shaft rotatable at variable rotation rates;
- a first rotor connected to said first shaft for rotation at variable rotation rates by said first shaft, said first rotor being configured to be one of a first element and a second element of an electrical machine;
- a second shaft rotatable at a controllable rotation rate;
- a second rotor connected to said second shaft to rotate said second shaft at said controllable rotation rate, said second rotor being configured to be the other of said first element and said second element of said electrical machine, said first element and said second element each being configured electrically and mechanically for one to rotate relative to the other to generate a torque to urge said second rotor to rotate;

means to generate a magnetic field connected to one of said first element and said second element to supply a magnetic field to interact between said first element and said second element;

torque varying means connected to one of said first rotor, said second rotor and said source of electrical power to vary said torque;

sensing means positioned and configured to sense the rotation rate of said second shaft, said sensing means being configured to supply a second shaft rate signal reflective of said rotation rate of said second shaft; and control means connected to said sensing means to receive said second shaft rate signal and connected to said torque varying means to supply a control signal thereto to vary said torque, said control means being configured to compare said rotation rate of said second shaft received from said sensing means with said controllable rotation rate and to generate said control signal to cause said force varying means to vary said torque to urge said second shaft to rotate at said controllable rotation rate.

36. The clutch of claim 35 wherein said means to generate the magnetic field are permanent magnets.

37. The clutch of claim 35 wherein said means to generate the magnetic field are electromagnets.

38. The clutch of claim 35 wherein one of said first element and said second element is a squirrel cage rotor.

* * * * *